Jan. 5, 1932.                W. N. BOOTH                1,839,829
                              WIRE WHEEL
                        Filed April 29, 1929    2 Sheets-Sheet 1
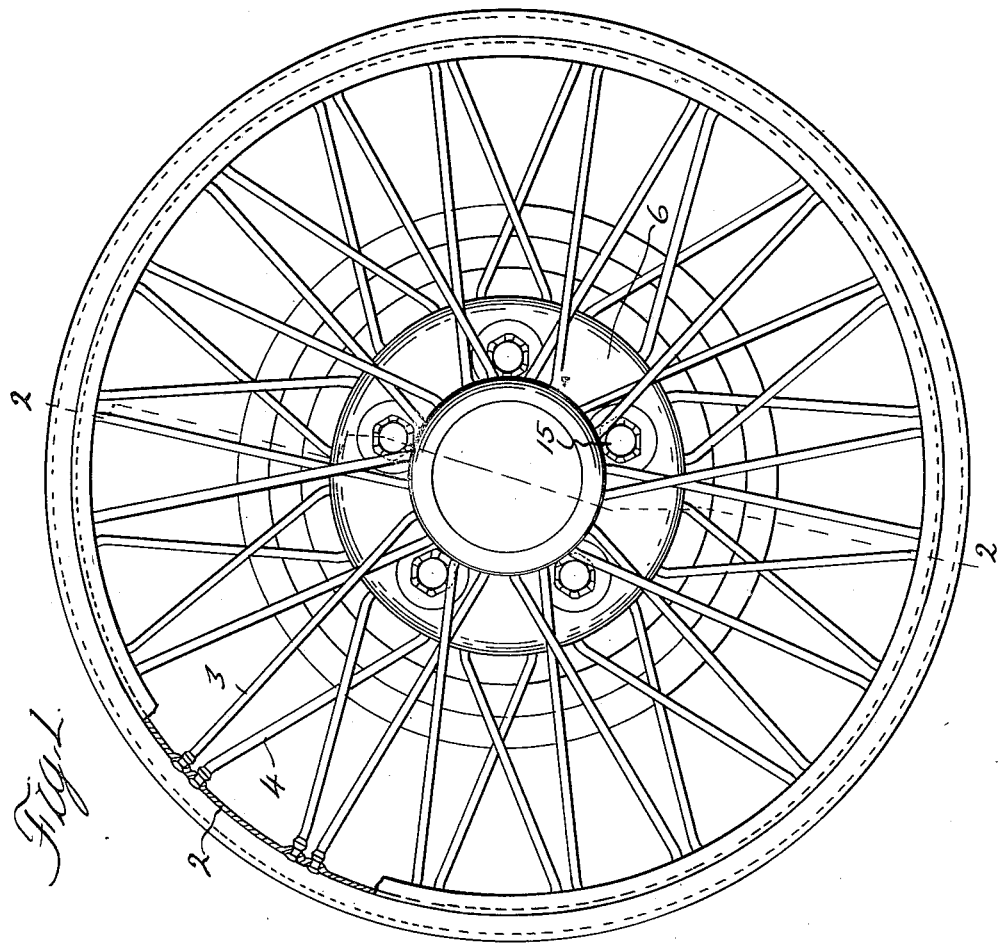
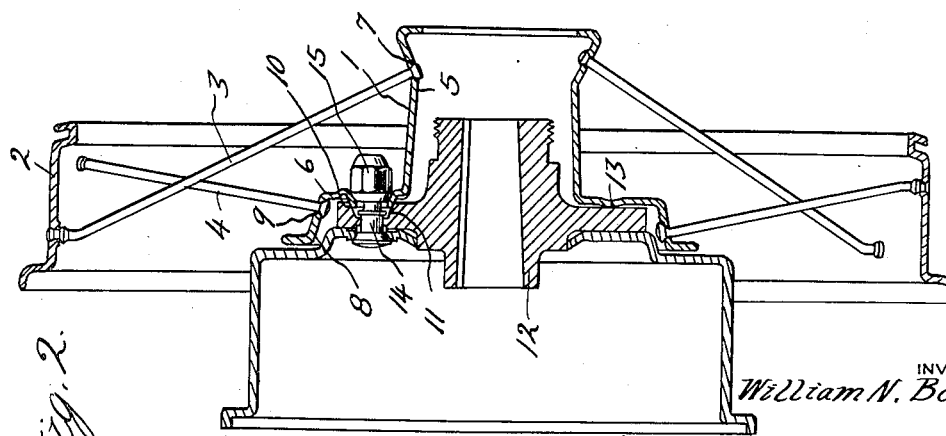
INVENTOR
William N. Booth
BY Whittemore Hulbert
   Whittemore Belknap
                                                    ATTORNEYS

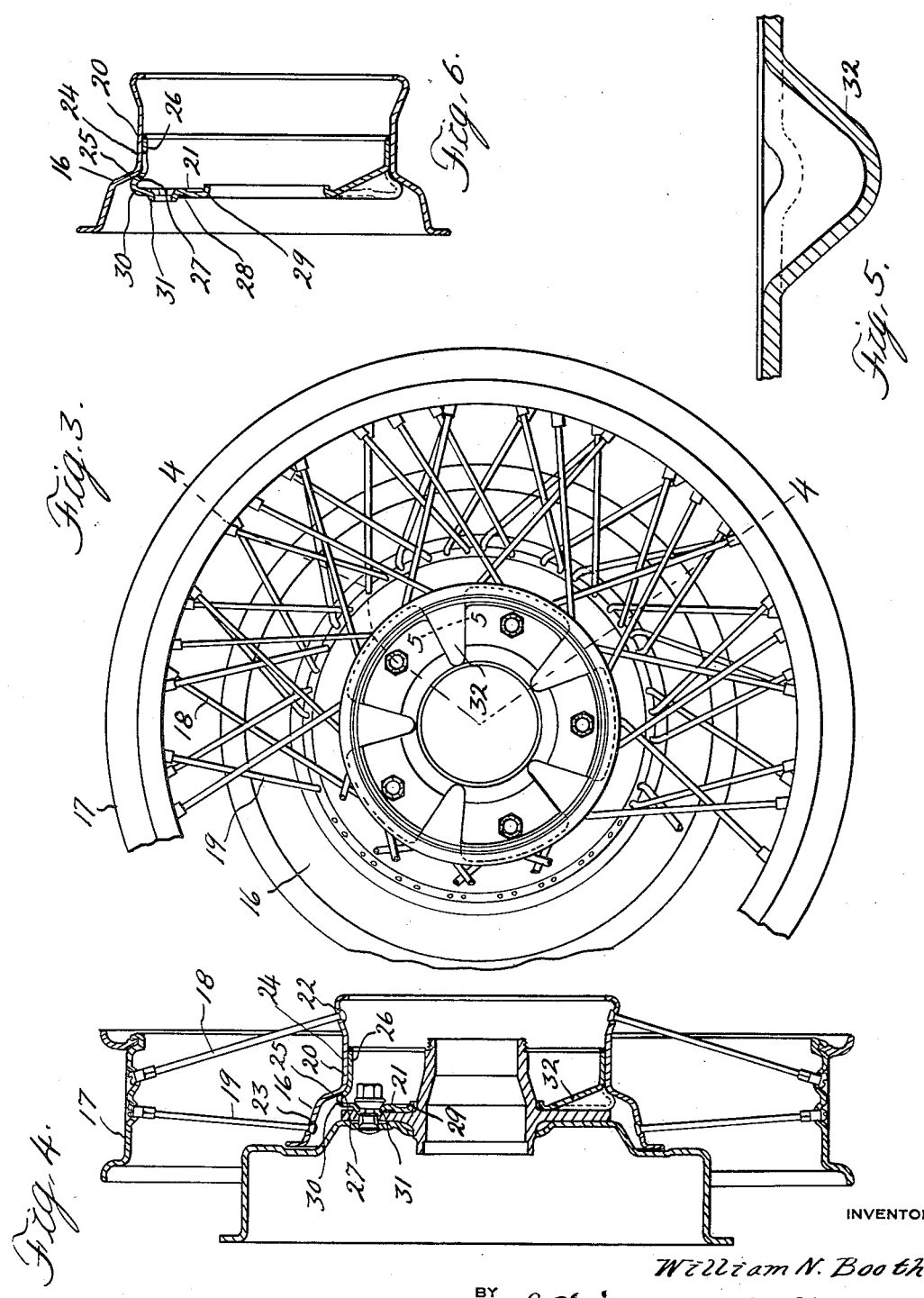

Patented Jan. 5, 1932

1,839,829

UNITED STATES PATENT OFFICE

WILLIAM N. BOOTH, OF DETROIT, MICHIGAN, ASSIGNOR TO KELSEY-HAYES WHEEL CORPORATION, OF DETROIT, MICHIGAN, A CORPORATION OF NEW YORK

WIRE WHEEL

Application filed April 29, 1929. Serial No. 359,129.

The invention relates to wire wheels and refers more particularly to wire wheels for motor vehicles. One of the objects of the invention is to provide interchangeable wire wheels of the type in which the bolt holes are concealed or located internally of the hub shells or outer hub members and in which the bolt holes are exposed or located externally of the hub shells or outer hub members. Another object is to so construct these wire wheels that their outer hub shells or outer hub members may be alternatively mounted upon the same wheel hub or inner hub member with the rim members occupying substantially the same position. A further object is to provide an improved construction of hub shell or outer hub member in which the bolt holes are concealed. With these as well as other objects in view, the invention resides in the novel features of construction and combinations and arrangements of parts as more fully hereinafter set forth.

In the drawings:—

Figure 1 is a front elevation of a wire wheel in which the bolt holes are exposed;

Figure 2 is a cross section on the line 2—2 of Figure 1;

Figure 3 is a front elevation, partly broken away, of a wire wheel in which the bolt holes are concealed;

Figure 4 is a cross section on the line 4—4 of Figure 3;

Figure 5 is a cross section on the line 5—5 of Figure 3.

Figure 6 is a cross-section on the line 4—4 of Figure 3 of the hub shell or outer hub member shown in the latter figure.

As shown in Figures 1 and 2 the wire wheel is of that type in which the bolt holes are exposed or located externally of the hub shell. This wire wheel has the hub shell or outer hub member 1, the tire carrying rim member 2 and the front and rear spokes 3 and 4, respectively.

The hub shell or outer hub member is formed of sheet metal and has the barrel section 5 and the flange section 6 extending outwardly from the rear end of the barrel section. The barrel section has at its front end the seats 7 for engaging the heads at the inner ends of the front spokes 3. The flange section has at its outer edge the transverse annular flange 8, which is formed with the seats 9 for engaging the heads at the inner ends of the rear spokes 4. The radially extending portion of the flange section is formed with the rearwardly extending tubular projections 10 for engaging correspondingly shaped recesses in the front face of the radial flange 11 upon the wheel hub or inner hub member 12. This radially extending portion is further provided with the rearwardly extending arcuate depressions 13 intermediate the tubular projections for bearing upon the radial flange and providing for resilient movement of the tubular projections to their seats upon the radial flange. 14 are bolts secured to and extending transversely forwardly from the flange 11 and adapted to pass through the tubular projections 10 and 15 are nuts threaded upon the bolts for detachably securing the hub shell or outer hub member 1 to the wheel hub or inner hub member 12. The arrangement of the spokes and their connection to the rim member and the hub shell or outer hub member locates the median plane of the rim member in close proximity to the radially extending portion of the hub shell or outer hub member.

As shown in Figures 3, 4 and 5, the wire wheel is of that type in which the bolt holes are concealed or located internally of the hub shell or outer hub member. This wire wheel has the hub shell or outer hub member 16, the tire carrying rim member 17 and the front and rear spokes 18 and 19, respectively.

The hub shell or outer hub member 16 has the sheet metal tubular section 20 and the sheet metal flange section 21 which extends inwardly toward the axis of the tubular section. The tubular section has at its front and rear ends the seats 22 and 23 respectively for engaging the heads at the inner ends of the front and rear spokes 18 and 19 respectively. Intermediate these front and rear seats the tubular section is formed with the reduced portion 24 providing the rearwardly facing interior annular shoulder 25. The flange section 21 has the annular flange 26 having a force fit in the reduced portion 24 and rigidly connected thereto. This annular flange has at its rear end the forwardly facing shoulder 27 for engaging the rearwardly facing shoulder 25 thereby positioning the sections relative to each other. The flange section 21 also has the radially inwardly extending flange 28 integral with the annular flange 26 and provided at its inner and outer edges with the rearwardly extending beads 29 and 30, respectively and intermediate these beads with the rearwardly extending angularly spaced tubular projections 31. For reinforcing the flange 27, there are the radially extending reinforcing ribs 32 located intermediate the tubular projections 31 and extending from the inner bead 29 forwardly and outwardly to the annular flange 26, the thickness of the walls forming these ribs preferably progressively increasing from their inner to their outer ends.

The tubular projections 31 are located to engage the same recesses of the wheel hub or inner hub member flange as the tubular projections 10 and are adapted to receive the same bolts and to be secured by the same nuts. The portions of the beads 29 and 30 radially opposite the tubular projections form surfaces for bearing upon the radial flange of the wheel hub or inner hub member, while the portions of the radially inwardly extending flange 28 surrounding the tubular projections provide for resilient movement of these tubular projections into contact with the radial flange. The front and rear spokes 18 and 19 respectively are so arranged and connected into the rim member 17 and the hub shell or outer hub member 16 that the median plane of the rim member occupies substantially the same lateral position relative to the radial flange as the median plane of the rim member 2.

From the above description, it will be seen that I have provided a construction of wire wheel of that type having concealed bolt holes which is interchangeable with a construction of wire wheel of that type having exposed bolt holes. It will also be seen that I have provided an improved construction of hub shell or outer hub member of the wire wheel having concealed bolt holes.

What I claim as my invention is:

1. In a wheel, an outer hub member having a tubular section provided with an interior annular shoulder intermediate its ends and a flange section provided with an annular flange within and engaging said tubular section, a portion of greater diameter than said annular flange engaging said annular shoulder and positioning said flange section axially with respect to said tubular section, and a flange extending inwardly toward the axis of said tubular section and formed with angularly spaced bolt receiving holes.

2. In a wire wheel, an outer hub member having a tubular section provided with axially spaced annular series of spoke engaging seats and an intermediate interior annular shoulder and a flange section provided with an annular flange within and engaging said tubular section, an intermediate portion of greater diameter than said annular flange engaging said annular shoulder and positioning said flange section axially with respect to said tubular section, and a flange extending inwardly toward the axis of said tubular section and formed with angularly spaced bolt receiving holes, said intermediate portion being between said annular flange and inwardly extending flange longitudinally of said outer hub member.

3. In a wire wheel, an outer hub member having a sheet metal tubular section with axially spaced annular series of spoke engaging seats and an intermediate interior rearwardly facing annular shoulder and a sheet metal flange section within said tubular section having an axially extending flange within and engaging said tubular section and rigidly secured thereto, a portion in the rear of said axially extending flange forming a forwardly facing shoulder of greater diameter than said axially extending flange and engaging said rearwardly facing shoulder and positioning said flange section axially with respect to said tubular section, and a flange extending inwardly toward the axis of said tubular section formed with rearwardly facing beads at its inner and outer edges and angularly spaced bolt receiving holes intermediate said beads.

In testimony whereof I affix my signature.

WILLIAM N. BOOTH.